United States Patent
Benisty et al.

(10) Patent No.: US 12,393,682 B2
(45) Date of Patent: Aug. 19, 2025

(54) PROTECTING STORAGE ARRAYS FROM LOAD ATTACKS

(71) Applicant: Dell Products L.P., Round Rock, TX (US)

(72) Inventors: Lior Benisty, Beer Sheva (IL); Efi Levi, Beer Sheva (IL); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 272 days.

(21) Appl. No.: 18/358,275

(22) Filed: Jul. 25, 2023

(65) Prior Publication Data

US 2025/0036757 A1    Jan. 30, 2025

(51) Int. Cl.
*G06F 21/55* (2013.01)
*G06F 21/54* (2013.01)

(52) U.S. Cl.
CPC ............ *G06F 21/554* (2013.01); *G06F 21/54* (2013.01); *G06F 21/552* (2013.01)

(58) Field of Classification Search
CPC ...... G06F 21/554; G06F 21/54; G06F 21/552; G06F 21/85
See application file for complete search history.

(56) References Cited

U.S. PATENT DOCUMENTS

| | | | |
|---|---|---|---|
| 11,916,938 B2* | 2/2024 | Giterman | G06N 20/00 |
| 2020/0120118 A1* | 4/2020 | Shu | G06F 21/54 |
| 2024/0244077 A1* | 7/2024 | Benisty | H04L 63/205 |

* cited by examiner

*Primary Examiner* — Han Yang
(74) *Attorney, Agent, or Firm* — WOMBLE BOND DICKINSON (US) LLP

(57) ABSTRACT

Methods and systems for managing storage services provided by storage arrays are disclosed. The storage services may be managed by proactively identifying and remediating malicious activity that may impact the storage services. The malicious activity may be identified by monitoring activity of adapters used by host devices to communicate with the storage arrays. The activity may be monitored to identify patterns of reset commands that are likely to negatively impact storage services provided by the storage arrays.

20 Claims, 5 Drawing Sheets

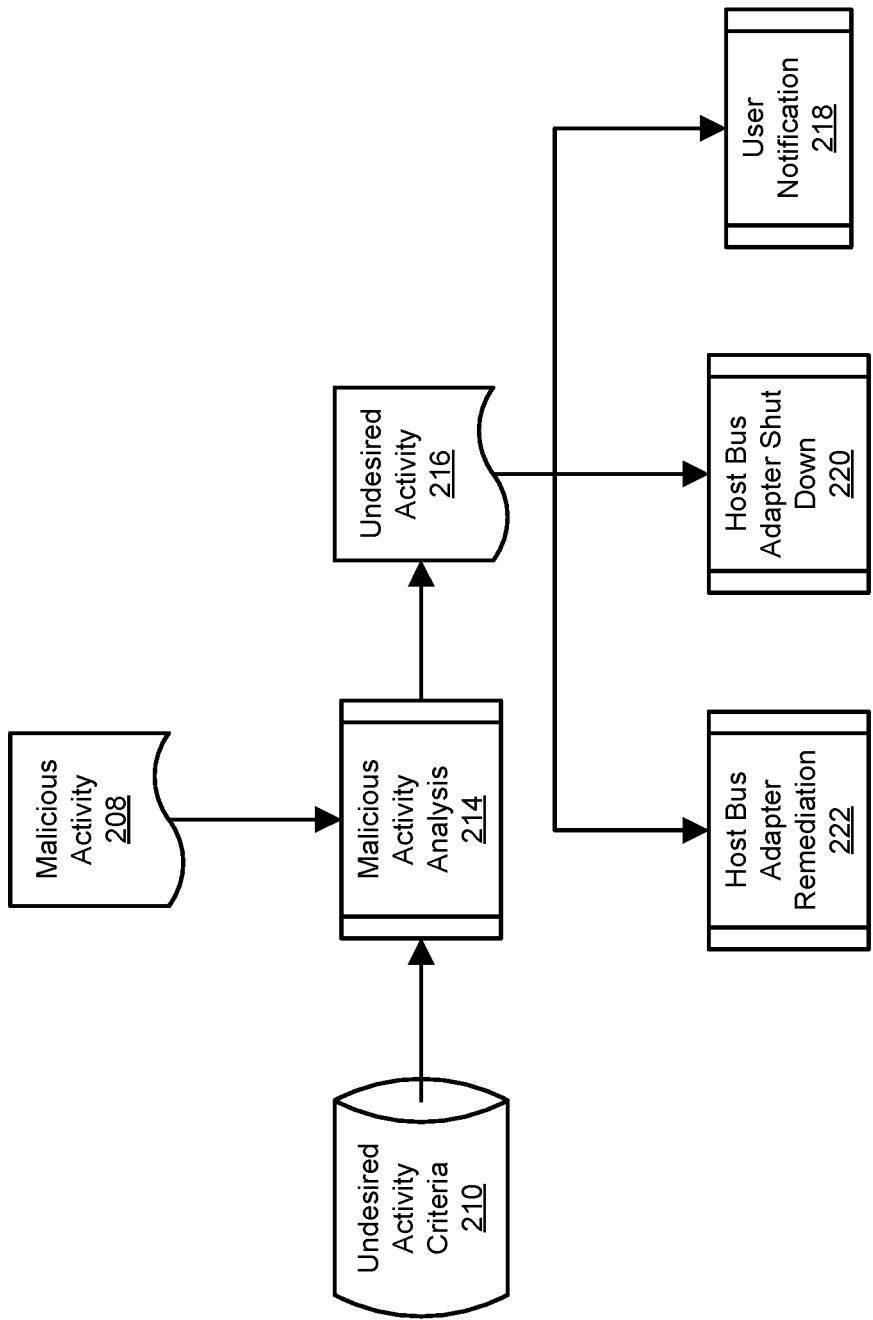

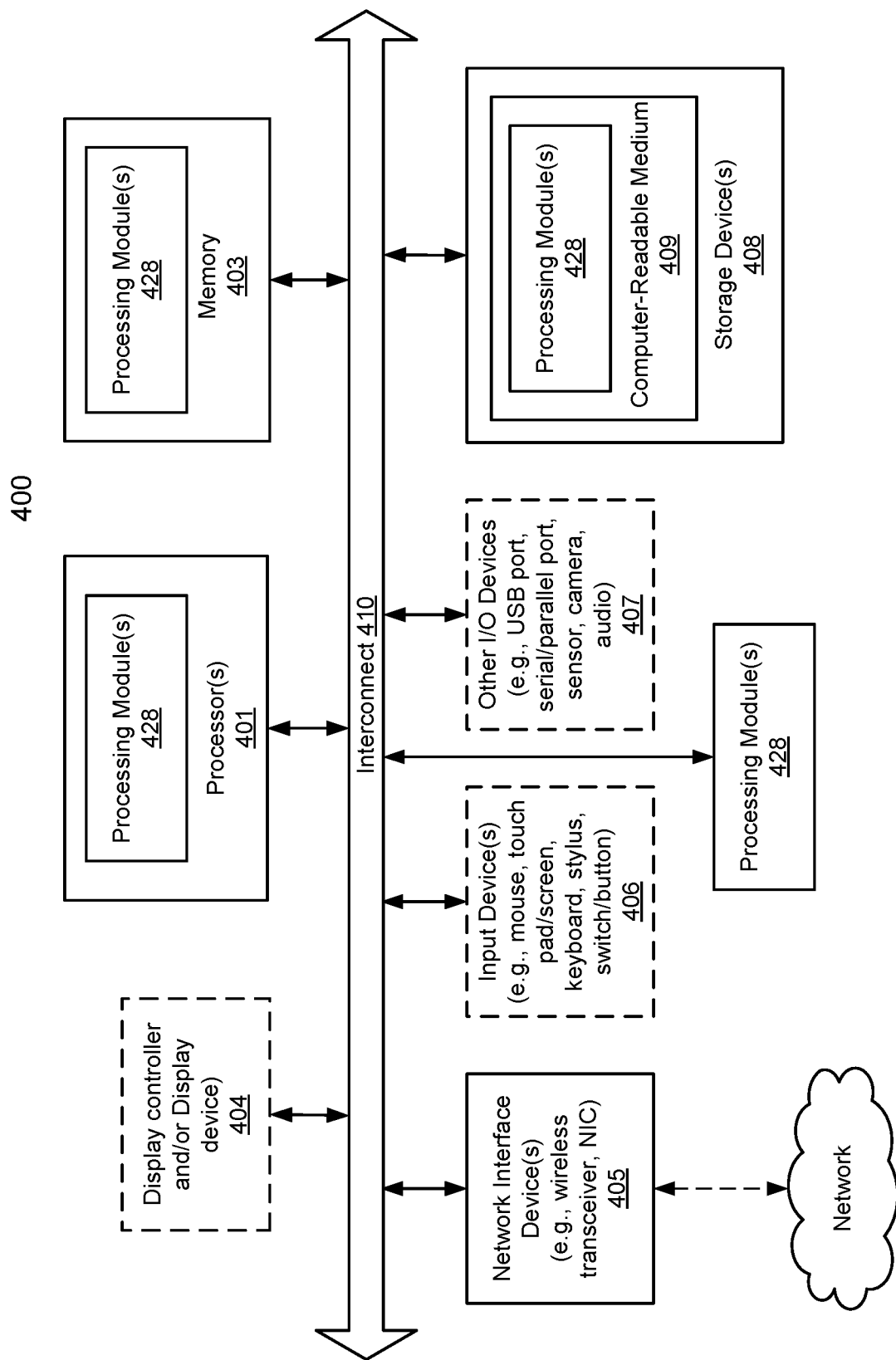

PROTECTING STORAGE ARRAYS FROM LOAD ATTACKS

FIELD

Embodiments disclosed herein relate generally to device management. More particularly, embodiments disclosed herein relate to managing storage arrays.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2B shows a second data flow diagram illustrating operation of a portion of a system in accordance with an embodiment.

FIG. 4 shows a block diagram illustrating a data processing system in accordance with an embodiment.

DETAILED DESCRIPTION

Figure 1:
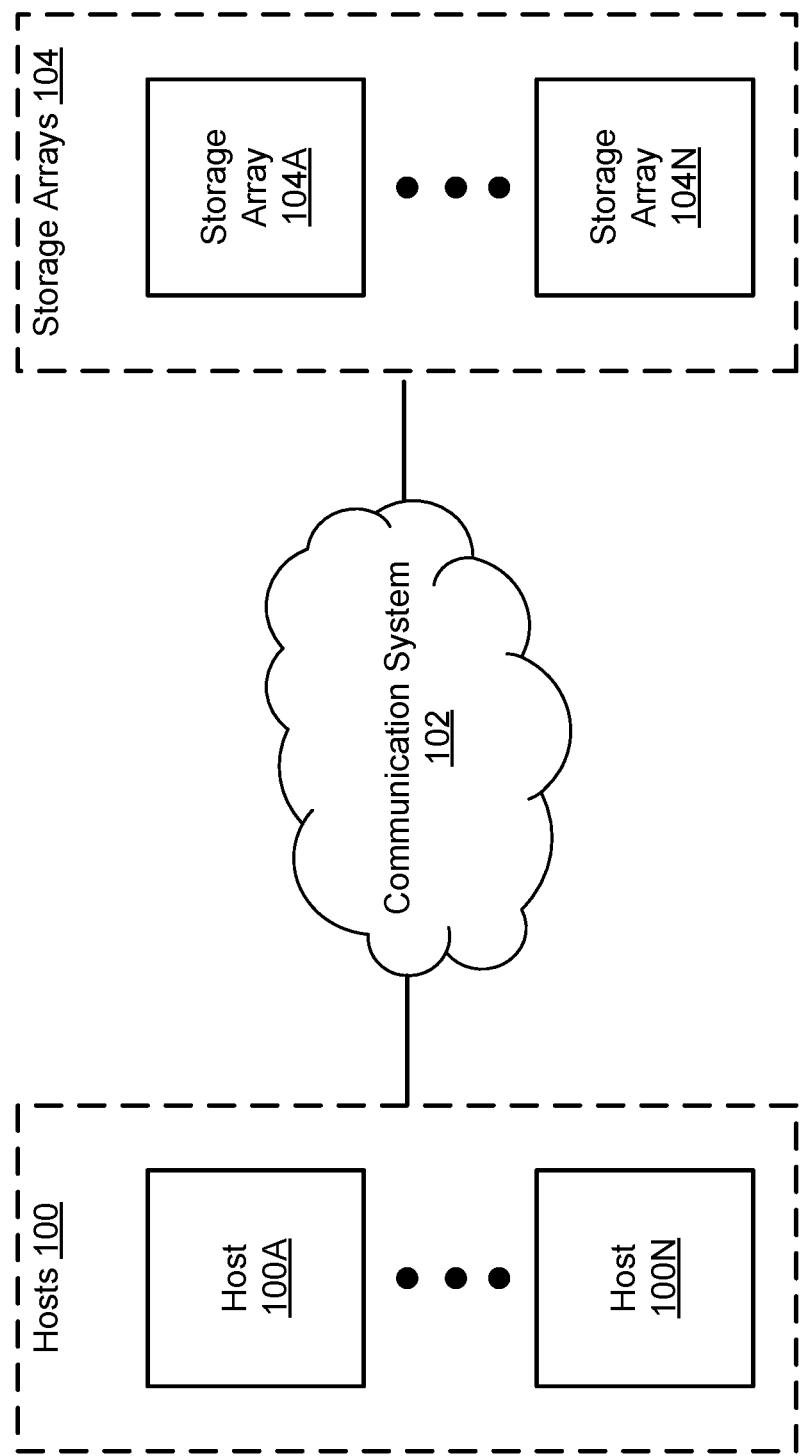
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to the methods and systems to manage storage services provided by storage arrays. The storage services may be used by host devices to provide desired computer implemented services. If the storage services are unable to be used by the hosts, the computer implemented services may be negatively impacted.

To manage the storage services, malicious activity impacting the storage arrays may be proactively identified and remediated. To identify malicious activity, activity of host bus adapters of the hosts may be monitored. The host bus adapter activity may be compared to activity patterns known to negatively impact the ability of the storage arrays to be provide storage services.

When such activities are identified, remedial actions may be performed. The remedial actions may prevent the patterns of activity from continuing, may address malware and/or other entities cause the malicious activity, and/or users may be notified of the malicious activity.

By doing so, embodiments disclosed herein may improve the likelihood of storage services being available for use through proactive identification and remediation of malicious activity.

In an embodiment, a method for securing a deployment is provided. The method may include (i) monitoring activity of a host bus adapter to obtain an activity pattern, (ii) making a determination regarding whether the activity pattern matches any activity pattern of activity patterns that indicate malicious activity by the host bus adapter, and (iii) when the activity pattern matches any of the activity patterns, performing an action set to mitigate an impact of the malicious activity.

Monitoring the activity may include identifying when reset commands are issued by the host bus adapter to queues maintained by the storage array.

The queues are adapted to queue input-output (IO) from any number of hosts that is directed to the storage array.

The reset commands may be adapted to cause the storage array to clear queued commands.

The activity pattern may specify a temporal arrangement of the reset commands.

The activity patterns may include a first activity pattern that specifies that rates of issued reset commands that exceed a threshold indicating the malicious activity.

Performing the action set may include performing at least one action from a group of actions consisting of (i) notifying a user of the reset commands that have been made, (ii) preventing the host bus adapter from issuing reset commands, and (iii) updating operation of the host bus adapter to prevent the malicious activity.

Preventing the host bus adapter may include disabling the host bus adapter.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

When the computer implemented services are performed, new data may be obtained and previously obtained data may be used. The new data may be stored in local and/or remote storage and previously obtained data may be accessed in the local and/or remote storage.

To facilitate use of remote storage (i.e., remote to a device that is generating/accessing data), the system of FIG. 1 may include storage arrays 104. Storage arrays 104 may provide data management services and may be remote to the devices that generate and/or use data. The data management services may include storing data and providing access to previously stored data.

To utilize the data management services provided by storage arrays 104, hosts 101 may include adapters (e.g., host bus adapters (HBAs)) that facilitate communication between hosts 101 and storage arrays 104 via communication system 102. The adapters may provide for direct input-output (IO) processing by hosts 100 using storage arrays 104.

When IO from a host is obtained, storage arrays 104 may process the IO. For example, in response to write commands, storage arrays 104 may store data.

Multiple hosts may utilize the storage services provided by a single storage array. In doing so, the IO from the multiple hosts may exceed the ability of the storage array to processes the IO. To manage IO that exceeds the processing capability of a storage array, the storage array may implement one or more queues (or other types of buffers). The IO may be added to a queue and processed over time as processing resources of a storage array become available.

However, over time the queues may encounter errors, bugs, or other issues that degrade the rate at which the IO is processed. If left unchecked, IO received by a storage array may exceed the size of the queues of the storage arrays.

To address errors in processing of queued IO, hosts 100 and storage arrays 104 may cooperatively manage the queues. Any of these entities may monitor operation of the queues and, when an issue is identified, issue a reset command to the queue. When issued, the queue may be emptied and restarted to address the encountered issue. Issuing a reset command may address the issue but may incur significant overhead. For example, the hosts that previously queued IO in the queue may be required to resend the IO storage array to have the IO be requeued. Additionally, purging the queue may be resource intensive and may require time.

To cooperatively manage the queues, hosts 100 may use their adapters to issue the reset commands. However, if the adapters become compromised by malware or other types of malicious entities, the adapters may issue unnecessary reset commands to various queues. Such reset commands may needlessly consume limited resources of storage arrays 104 for implementing the queue resets rather than providing desire storage services. Consequently, access to the storage services may be limited thereby impacting the computer implemented services provided by hosts 100.

For example, the reset command may be used in denial of services attacks. In DDoS attacks, reset commands may be used to interrupt computer implemented services by disrupting IO processing by storage arrays.

In general, embodiments disclosed here relate to systems and methods for improving the likelihood that storage arrays are able to provide desired storage services. The likelihood may be improved by (i) monitoring for activity patterns indicating malicious activity, and (ii) taking action based on detected activity patterns. To monitor for activity patterns, the system of FIG. 1 may monitor the activity of adapters of hosts 100. The monitored activity may be matched activity patterns that are considered to be malicious. The malicious activity patterns may include issuing of reset commands to queues of storage arrays.

In the event that a pattern of malicious activity is identified, various remedial actions may be performed. The remedial actions may include any of: (i) notifying users (e.g., administrators) of the reset commands that have been made, (ii) preventing the adapter found to have exhibited malicious activity from issuing reset commands, and/or (iii) updating operation of the adapters found to have exhibited malicious activity to prevent further malicious activity.

For example, adapters that issue reset commands at a frequency higher than is common may be likely to be compromised. In response to the high frequency of reset commands, the adapter may be treated as exhibiting an activity pattern that is malicious.

In response to the activity pattern being identified as being malicious, the user of the host exhibiting the malicious activity may be notified of the high frequency of reset commands being issued. In addition to notifying the user of the malicious activity, the adapter of the host may be prevented from issuing reset commands. Finally, operation of the adapter may be updated by performing diagnostics on the adapter. The diagnostics may find either a hardware error with the adapter and/or traces of malicious entities (e.g., malware) on the adapter.

By doing so, storage arrays 104 may be more likely to be able to provide desired storage services through proactive identification and remediation of compromised adapters of hosts 100.

To provide the above noted functionality, the system may include hosts 100, storage arrays 104, and communication system 102. Each of the components is discussed below.

Figure 2A:
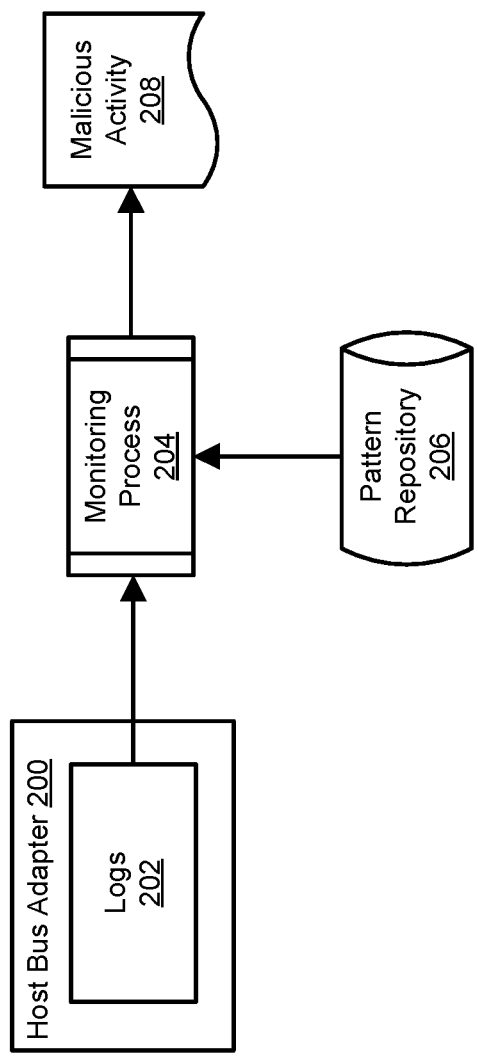
FIG. 2A shows a first data flow diagram illustrating operation of a portion of a system in accordance with an embodiment.

Hosts 100 may provide the computer implemented services, discussed above. To provide the computer implemented services, hosts 100 may utilize services provided by storage arrays 104 by directing IO to storage arrays 104. To direct IO to storage arrays 104, hosts 100 may include one or more HBAs, as discussed above. The HBA may generate logs of commands that have been issued by the HBA. The logs may be monitored for activity patterns of reset commands indicative of malicious activity. Refer to FIG. 2A for additional details regarding monitoring of HBAs in hosts 100.

In the event that malicious activity may have been discovered, the user of the host may be notified of the malicious activity. In addition to notification, one or more HBAs may be prevented from issuing reset commands that exhibited the activity pattern. In addition, operation of one or more HBAs may be updated to prevent further malicious activity. Refer to FIG. 2B for additional details regarding responses to malicious activity in HBAs.

Storage arrays 104 may provide data storage services (e.g., storing data, deleting storage data, providing copies of stored data, etc.). To provide the data storage services, storage arrays 104 may (i) implement queues for IO, (ii) cooperatively manage the queues with hosts 100, and (iii) process the queued IO as resources allow. To cooperatively manage the queues with hosts 100, IO from various hosts may be queued in corresponding queues (e.g., may be based on operable connectivity with, for example, per port queues and all IO from a given port being staged with a corresponding queue). When requests from hosts regarding resetting of a queue is received, the storage arrays may comply with the requests. Consequently, a compromised adapter of a host may issue reset commands that may impact various queues.

Thus, a system in accordance with an embodiment may improve the likelihood of successfully providing data storage services through proactive identification and remediation of compromised adapters of hosts.

Any of (and/or components thereof) hosts 100 and storage arrays 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Storage arrays 104 may be implemented using any number of storage devices including, for example, hard disk drives, solid state storage devices, tape drives, storage controllers, and/or other devices that facilitate storage of data.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

Communication system 102 may be implemented using a communication fabric and/or other communication architecture. The communication architecture may implement various protocols and interfaces including, for example, the Small Computer System Interface (SCSI).

While illustrated in FIG. 1 as including a limited number of specific components, a system in accordance with an embodiment may include fewer, additional, and/or different components than those components illustrated therein.

To further clarify embodiments disclosed herein, data flow diagrams are shown in FIG. 2A-2B. These data flow diagrams show flows of data that may be implemented by the system of FIG. 1. In FIG. 2A, data flows during monitoring for patterns of malicious activity in accordance with an embodiment are shown. In FIG. 2B, data flows during responses to identified patterns of malicious activity in accordance with an embodiment are shown.

Turning to FIG. 2A, a first data flow diagram illustrating a data flow during pattern monitoring for malicious activity identification in accordance with an embodiment is shown. The data flow may occur while activity of adapters of hosts are monitored for signs of malicious activity.

To monitor for signs of malicious activity, host bus adapter 200 may generate logs 202. Logs 202 may include information regarding activity performed by host bus adapter 200. Host bus adapter 200 may be similar to any host bus adapter of hosts 100.

The activity may indicate when reset commands for queues of a storage array are issued by host bus adapter 200 (and/or other activity such as issuing general IO that relates to addition, modification, and/or deletion of data, executable operations, etc.). Logs 202 may record any type and quantity of such activity for host bus adapter 200.

As logs 202 are generated and/or after generation, logs 202 may be ingested by monitoring process 204. Monitoring process 204 parse logs 202 and analyze patterns of commands present in the parsed logs. The parsed logs may be analyzed by comparing the sequence of issuance of various commands to patterns from pattern repository 206. Pattern repository 206 may include patterns of activity that are considered to be malicious.

Monitoring process 204 may compare patterns found in logs 202 to patterns specified by pattern repository 206 as being malicious. The patterns specified by pattern repository may include (i) issuing reset commands at a rate that exceeds a threshold, (ii) issuing reset commands to queues that a host (that hosts the HBA) does not direct other types of IO toward, (iii) issuing reset commands in bursts with periods of low reset commands in between the bursts, (iv) issuing reset commands at certain rates towards queues that service a particular logical unit number of a storage array, and/or other types of patterns. Once matched within a pattern, monitoring process 204 may declare that malicious activity 208 has been found.

If found, remedial activity may be performed. Refer to FIG. 2B for additional details regarding remedial activity.

Host bus adapter 200 may be implemented using a hardware device. The hardware device may connect a processing complex (e.g., processors, memory) to the storage array to facilitate use of the storage services provided by the storage array by the processing complex.

Output logs 202 may be implemented using a data structure. The data structure may be used to catalogue activity by HBAs hosted by hosts. Population of logs 202 may be done by host bus adapter 200.

Pattern repository 206 may be implemented using a database or other types of large scale data structure. The database may include one or more activity patterns that are considered malicious.

Thus, using the method shown in FIG. 2A, a host may identify malicious activity of HBAs through monitoring of reset activity. Once malicious activity is identified, various remedial action may be performed.

Turning to FIG. 2B, a second data flow diagram illustrating a data flow during responses to identified malicious activity in accordance with an embodiment is shown.

To manage malicious activity, when malicious activity 208 is identified, malicious activity 208 may be further analyzed. To further analyze malicious activity, malicious activity 208 may be ingested by malicious activity analysis 214 process. During malicious activity analysis 212, malicious activity 208 may be analyzed to identify whether the malicious activity is sufficiently egregious to warrant action.

To make the determination, malicious activity 208 may be compared to various criteria specified by undesired activity criteria 210. Undesired activity criteria 210 may specify various thresholds and/or other kinds of comparison criteria. If the criteria is met by malicious activity 208, then malicious activity 208 may be labeled as undesired activity 216.

When malicious activity 208 is identified as undesired activity 216, one or more remedial actions may be performed. The remedial action may include: (i) user notification 218 may be performed, host bus adapter shut down 220 may be performed, and/or host bus adapter remediation 222 may be performed.

During user notification 218, the user may be informed that malicious activity 208 has been identified as undesired activity 216 being performed by a HBA.

During host bus adapter shut down 220, the HBA exhibiting undesired activity 216 may be shut down.

During host bus adapter remediation 222, various actions such as scanning for malware/other malicious software, and attempting to remediate any malicious entities may be performed. Similarly, various configurations may be altered to attempt to address any errors in operation exhibited by the HBA.

While illustrated with respect to a limited number and types of remedial activity, it will be appreciated that additional, different, and/or other types of remedial activities may be performed when undesired activity 216 is identified as being exhibited by a HBA.

Thus, via the data flow shown in FIG. 2B, a system in accordance with an embodiment may be more likely to provide desired data storage services through proactive remediation of compromised HBAs.

Figure 3:
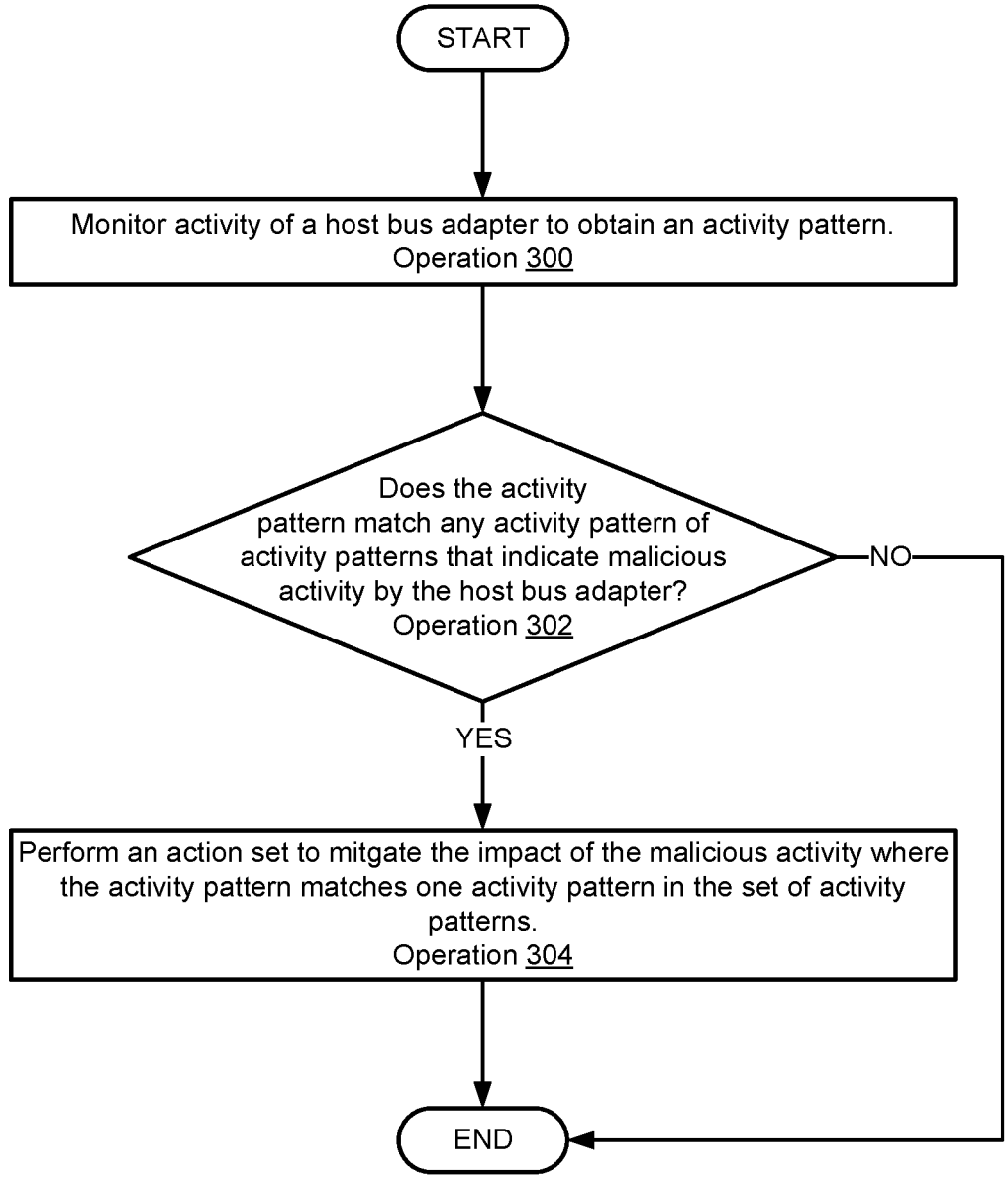
FIG. 3 show a flow diagram illustrating a method of managing storage services in accordance with an embodiment.

As discussed above, the components of FIG. 1 may perform various methods to monitor and respond to undesired activity from reset commands. FIG. 3 illustrates methods that may be performed by the components of FIG. 1. In the diagrams discussed below and shown in FIG. 3, any of the operations may be repeated, performed in different orders, and/or performed in parallel with and/or in a partially overlapping in time manner with other operations.

Turning to FIG. 3, a flow diagram illustrating monitoring and responding to undesired activity from reset commands. The method may be performed by one or more of hosts 100, storage arrays 104, and/or other components of the system of FIG. 1.

At operation 300, the activity of a host bus adapter may be monitored to obtain an activity pattern (e.g., a host bus adapter activity pattern). The activity of a host bus adapter may be monitored by identifying when reset commands are issued by the host bus adapter. The reset commands may be identified by parsing logs of activity of the host bus adapter.

At operation 302, a determination is made regarding whether the activity pattern matches any pattern of activity patterns that indicate malicious activity by the host bus adapter. The determination may be made by analyzing the activity pattern against undesired activity pattern criteria. The activity pattern may specify a temporal arrangement of reset commands. The activity pattern may specify a temporal arrangement by executing reset commands at a measured rate. The set of activity patterns may include a first activity pattern that specifies that rates of issued reset commands that exceed a threshold indicate the malicious activity. The set of activity patterns may include a first activity pattern by noting an activity pattern that exceeds a threshold indicating malicious activity.

If the activity pattern matches any of the activity patterns, then the method may proceed to operation 304. Otherwise, the method may end following operation 302.

At operation 304, an action set may be performed to mitigate the impact of the malicious activity where the activity pattern matches one activity pattern in the set of activity patterns. The action set may be performed by (i) notifying a user of the reset commands that have been made, (ii) preventing the host bus adapter from issuing reset commands, and/or (iii) updating operation of the host bus adapter to prevent the malicious activity.

The user may be notified of the reset commands by sending a message from the system of FIG. 1 to a device of the user. The message may indicate that reset commands have been made.

The host bus adapter may be prevented from issuing reset commands by disabling the host bus adapter. The host bus adapter may be disabled by requesting that a management entity (e.g., an operating system) disable the host bus adapter.

The operation of the host bus adapter may be updated by (i) notifying the user of the error with the host bus adapter as a source of the reset commands when an error with the host bus adapter has occurred or (ii) employing the software to search for the source that is responsible for the reset commands when the error with the host bus adapter has not occurred. The user may be notified of the error by receiving a message from the system of FIG. 1 that the host bus adapter was the source of the reset commands. The software may be employed by implementing monitoring software that may be related to the monitoring process for pattern activity of the reset commands.

The method may end following operation 304.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data storage services provided by a storage array, the method comprising:
monitoring activity of a host bus adapter to obtain a host bus adapter activity pattern, the host operably connecting a host to the storage array to facilitate use of the data storage services provided by the storage array;
making a determination regarding whether the host bus adapter activity pattern matches any activity pattern of activity patterns that indicate malicious activity by the host bus adapter; and
in a first instance of the determination where the host bus adapter activity pattern matches any activity pattern of the activity patterns:
performing an action set to mitigate an impact of the malicious activity.

2. The method of claim 1, wherein monitoring the activity comprises:
identifying when reset commands are issued by the host bus adapter to queues maintained by the storage array.

3. The method of claim 2, wherein the queues are adapted to queue input-output (IO) from any number of hosts that is directed to the storage array.

4. The method of claim 3, wherein the reset commands are adapted to cause the storage array to clear queued commands from one of the queues.

5. The method of claim 2, wherein the host bus adapter activity pattern specifies a temporal arrangement of the reset commands.

6. The method of claim 1, wherein the activity patterns comprises a first activity pattern that specifies that rates of issued reset commands that exceed a threshold indicate the malicious activity.

7. The method of claim 1, wherein performing the action set comprises performing at least one action from a group of actions consisting of:
notifying a user of the host bus adapter activity pattern;
preventing the host bus adapter from issuing reset commands; and
updating operation of the host bus adapter to prevent the malicious activity.

8. The method of claim 7, wherein preventing the host bus adapter from issuing reset commands comprises:
disabling the host bus adapter.

9. A non-transitory machine-readable medium having instructions stored therein, which when executed by a processor, cause the processor to perform operations for managing data storage services provided by a storage array, the operations comprising:
monitoring activity of a host bus adapter to obtain a host bus adapter activity pattern, the host bus operably connecting a host to the storage array to facilitate use of the data storage services provided by the storage array;
making a determination regarding whether the host bus adapter activity pattern matches any activity pattern of activity patterns that indicate malicious activity by the host bus adapter; and
in a first instance of the determination where the host bus adapter activity pattern matches one activity pattern of the activity patterns:
performing an action set to mitigate an impact of the malicious activity.

10. The non-transitory machine-readable medium of claim 9, wherein monitoring the activity comprises:
identifying when reset commands are issued by the host bus adapter to queues maintained by the storage array.

11. The non-transitory machine-readable medium of claim 10, wherein the queues are adapted to queue input-output (IO) from any number of hosts that is directed to the storage array.

12. The non-transitory machine-readable medium of claim 11, wherein the reset commands are adapted to cause the storage array to clear queued commands.

13. The non-transitory machine-readable medium of claim 10, wherein the host bus adapter activity pattern specifies a temporal arrangement of the reset commands.

14. The non-transitory machine-readable medium of claim 9, wherein the activity patterns comprises a first activity pattern that specifies that rates of issued reset commands that exceed a threshold indicating the malicious activity.

15. A data processing system, comprising:

a processor;

a host bus adapter; and a memory coupled to the processor to store instructions, which when executed by the processor, cause the data processing system to perform operations for managing data storage services provided by a storage array, the operations comprising:

monitoring activity of the host bus adapter to obtain a host bus adapter activity pattern, the host bus operably connecting the data processing system to the storage array to facilitate use of the data storage services provided by the storage array;

making a determination regarding whether the host bus adapter activity pattern matches any activity pattern of activity patterns that indicate malicious activity by the host bus adapter; and in a first instance of the determination where the host bus adapter activity pattern matches one activity pattern of the activity patterns:

performing an action set to mitigate an impact of the malicious activity.

16. The data processing system of claim 15, wherein monitoring the activity comprises:

identifying when reset commands are issued by the host bus adapter to queues maintained by the storage array.

17. The data processing system of claim 16, wherein the queues are adapted to queue input-output (IO) from any number of hosts that is directed to the storage array.

18. The data processing system of claim 17, wherein the reset commands are adapted to cause the storage array to clear queued commands.

19. The data processing system of claim 18, wherein the host bus adapter activity pattern specifies a temporal arrangement of the reset commands.

20. The data processing system of claim 15, wherein the activity patterns comprises a first activity pattern that specifies that rates of issued reset commands that exceed a threshold indicating the malicious activity.

* * * * *